(12) United States Patent
Vanparys et al.

(10) Patent No.: US 7,997,649 B2
(45) Date of Patent: Aug. 16, 2011

(54) TRACTION WIRE ARRANGEMENT AND ADJUSTABLE SUPPORT ASSEMBLY USING THE TRACTION WIRE ARRANGEMENT

(75) Inventors: Maarten Vanparys, Meulebeke (BE); Jo Pattyn, Geluwe-Wervik (BE)

(73) Assignee: L&P Swiss Holding AG, Wittenbach (CH)

( * ) Notice: Subject to any disclaimer, the term of this patent is extended or adjusted under 35 U.S.C. 154(b) by 153 days.

(21) Appl. No.: 11/922,376

(22) PCT Filed: Jun. 13, 2006

(86) PCT No.: PCT/EP2006/005699
§ 371 (c)(1),
(2), (4) Date: Feb. 26, 2009

(87) PCT Pub. No.: WO2006/133913
PCT Pub. Date: Dec. 21, 2006

(65) Prior Publication Data
US 2009/0184552 A1    Jul. 23, 2009

(30) Foreign Application Priority Data
Jun. 15, 2005 (EP) .................................... 05012899

(51) Int. Cl.
A47C 7/14  (2006.01)
A47C 7/46  (2006.01)
(52) U.S. Cl. ................................. 297/284.4; 297/284.2
(58) Field of Classification Search ............... 297/284.4, 297/284.2
See application file for complete search history.

(56) References Cited

U.S. PATENT DOCUMENTS
5,016,490 A  5/1991  Jaksic et al.
5,277,080 A  1/1994  Roelle
(Continued)

FOREIGN PATENT DOCUMENTS
DE       2454240 A1    5/1976
(Continued)

OTHER PUBLICATIONS
PCT International Search Report for PCT/EP2006/005699.

Primary Examiner — Rodney B White

(57) ABSTRACT

In order to symmetrically act on a support member (20) of a support assembly on both sides using a single Bowden cable (18), a traction cable arrangement is used with comprises the Bowden cable, a first traction wire (17), and a coupling device (16) for coupling the first traction wire (17) to the Bowden cable (18). The first traction wire (17) is fixedly attached to the coupling device (16) and extends therefrom in a first direction. The sheath of the Bowden cable (18) is fixedly attached to the coupling device (16), and the wire of the Bowden cable (18) extends from the coupling device (16) in a second direction substantially opposite to the first direction and forms a second traction wire (19). The first traction wire (17) and the second traction wire (19) are slidably held on the support member (20) and are connected to a seat frame (30) at their ends. When the wire of the Bowden cable (18) is retracted with respect to the sheath, the second traction wire (19) is shortened, the coupling device (16) is displaced in the extending direction of the second traction wire (19), whereby a tensile force is also generated in the first traction wire (17). Consequently, the first traction wire (17) and the second traction wire (19) symmetrically act on the support member (20) on both sides thereof.

24 Claims, 7 Drawing Sheets

U.S. PATENT DOCUMENTS

Figure 1:
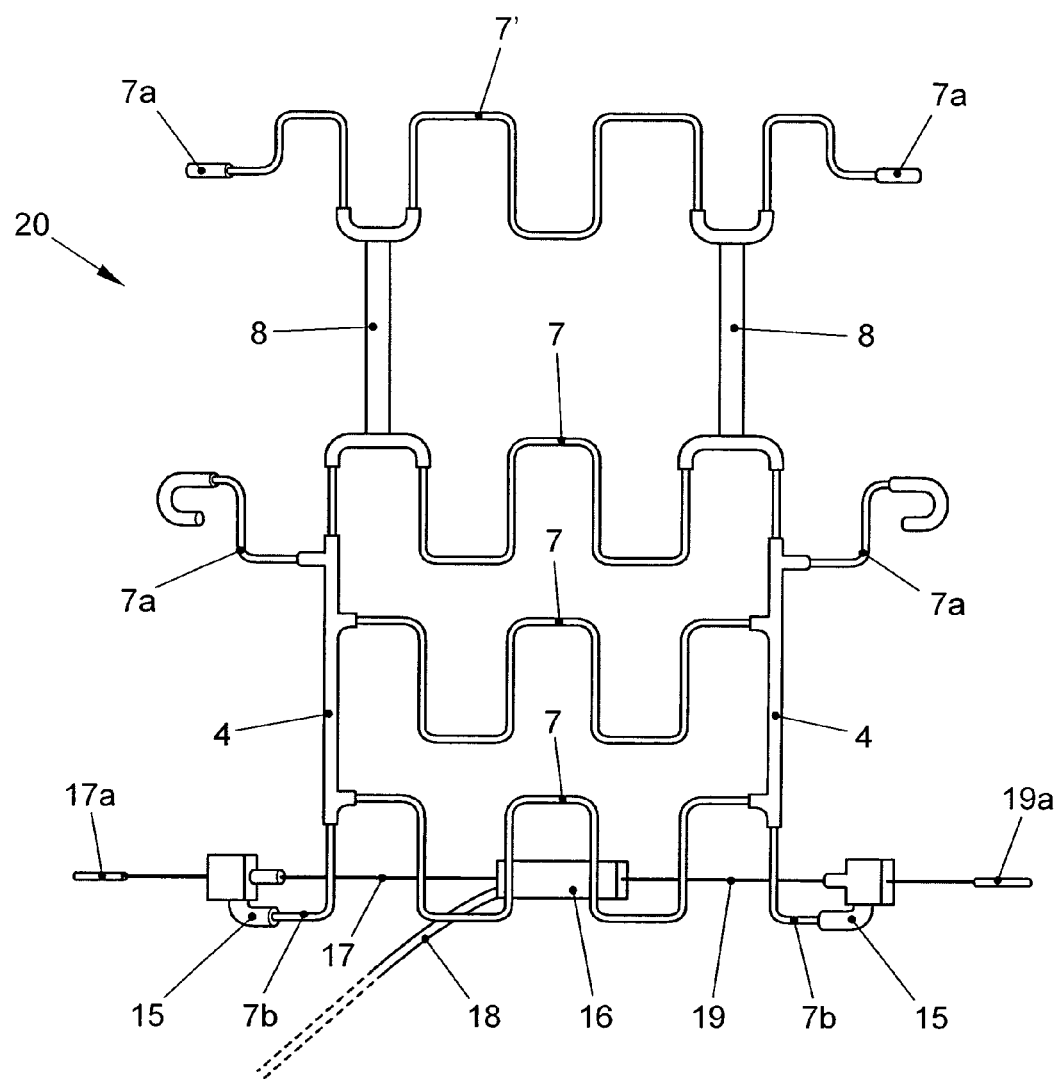

| | | | |
|---|---|---|---|
| 5,626,390 A | 5/1997 | Schuster et al. | |
| 6,152,531 A * | 11/2000 | Deceuninck | 297/284.4 |
| 6,499,803 B2 * | 12/2002 | Nakane et al. | 297/284.4 |
| 6,557,938 B1 | 5/2003 | Long | |
| 7,549,700 B2 * | 6/2009 | Blendea | 297/284.4 |
| 7,690,726 B2 * | 4/2010 | Samain | 297/284.4 |
| 2002/0011129 A1 | 1/2002 | Petrak | |
| 2002/0149245 A1 | 10/2002 | Mundell | |
| 2006/0273643 A1 * | 12/2006 | McMillen | 297/284.4 |

FOREIGN PATENT DOCUMENTS

| | | |
|---|---|---|
| WO | WO 00/00064 | 1/2000 |

\* cited by examiner

TRACTION WIRE ARRANGEMENT AND ADJUSTABLE SUPPORT ASSEMBLY USING THE TRACTION WIRE ARRANGEMENT

CROSS-REFERENCE TO RELATED APPLICATIONS

This application claims priority to PCT/EP2006/005698 filed on Jun. 13, 2006; which claims priority to EP 05012898.2 filed Jun. 15, 2005.

The present invention relates to a traction wire arrangement and to an adjustable support assembly for a seat in which the traction wire arrangement is used for adjusting the degree of support provided by the support assembly. In particular, the present invention relates to an adjustable lumbar support assembly having a support member which is configured as a wire framework having two lateral side wires and a plurality of transverse wires extending between the two lateral side wires and providing load bearing support for upholstery of a seat, e.g. a vehicle seat.

Support assemblies of the afore-mentioned kind are well-known in the art and may have various configurations determined by the design of the seat in which the support assembly is to be mounted. A support assembly is for example known from GB 2 342 287 A. The support assembly described in this document comprises a wire framework having two lateral side wires which are suspendable in a seat frame and between which extend a plurality of transverse wires for providing load bearing support for upholstery of the seat. The transverse wires are attached to the lateral side wires by being wound around the latter in the form of a helix with an end portion of the respective transverse wires extending substantially perpendicular to the respective lateral side wires. Some of the transverse wires extend beyond the respective lateral side wire and terminate in free ends which can be formed as hook-like fingers for attachment to the seat frame, e.g. by providing eyes on the seat frame with which the hook-like fingers may be engaged. Other known attachment means comprise springs for coupling the support assembly to the seat frame.

Furthermore, it is known from EP 0 552 904 B1 to provide an adjusting mechanism for a support assembly. The support assembly disclosed in this document is attached to a seat frame via springs, and Bowden cable mechanisms are provided by means of which the support assembly can be pivoted at hinge points provided in the lateral side wires. A further mechanism without such hinges is known from U.S. Pat. No. 5,988,745 A.

In order to adjust the degree of lumbar support, usually the support member or a part thereof is moved in a direction extending perpendicular to the support plane. The support assembly may be pivoted about a transversal axis, may be arched or may be moved as a whole. In each case, it is desirable that the support member is moved on both of its lateral sides in a similar manner so that a symmetric lumbar support feeling is created. This is, however, difficult to achieve and typically requires two separate Bowden cable arrangements.

Therefore, it is an object of the present invention to provide an improved possibility for simultaneously acting on the two sides of a support member, so that a symmetric support can be realized easily with only few components and at low cost.

This object is achieved by a traction wire arrangement for an adjustable support assembly according to independent claim 1. The dependent claims define preferred and advantageous embodiments of the present invention.

According to the invention, the traction wire arrangement comprises a Bowden cable having a wire and a sheath, a first traction wire, and a coupling device for coupling the first traction wire and the Bowden cable. The sheath of the Bowden cable is at one end fixedly attached to the coupling device. The first traction wire is at one end fixedly attached to the coupling device and extends from the coupling device in a first direction. The wire of the Bowden cable extends from the coupling device in a second direction which is substantially opposite to the first direction and forms a second traction wire.

In this arrangement, the length of the second traction wire extending from the coupling device can be shortened by means of the Bowden cable, for which purpose preferably an actuating mechanism is connected to the other end of the Bowden cable, i.e. the end which is not connected to the coupling device. Upon shortening the second traction wire, a tensile force is applied to the coupling device which therefore is moved in the second direction. By moving the coupling device in the second direction, in turn a tensile force is transmitted via the first traction wire, but with an opposite direction. Consequently, the traction wire arrangement allows for the application of a first tensile force with respect to an end point of the first traction wire and a second tensile force with respect to an end point of the second traction wire, using only a single Bowden cable and a single actuating mechanism. The tensile force is symmetrically divided between the two traction wires, which makes the traction wire arrangement in particular suitable for an adjustable support assembly in which the degree of support is adjusted by acting simultaneously on a first side and a second side of a support member. The traction wire arrangement has a simple structure and can thus be easily manufactured at low cost.

The coupling device preferably comprises guiding means for guiding the second traction wire into the second direction, i.e. into a direction opposite to that in which the first traction wire extends. In this way, it is accomplished that the tensile forces transmitted by the first traction wire and the second traction wire can effectively be directed so as to act in opposite directions, thereby achieving an optimum utilisation of the power transmitted via the Bowden cable and avoiding sharp bendings of the traction wires.

According to a preferred embodiment, the guiding means for guiding the second traction wire are formed as a guiding hole extending through a body of the coupling device. In this case, the diameter of the guiding hole is preferably equal to or slightly larger than that of the second traction wire. The guiding hole may at one end thereof have a portion having a diameter substantially corresponding to that of the outer diameter of the sheath of the Bowden cable, whereby a receiving portion for the sheath of the Bowden cable and a shoulder are formed inside the guiding hole, the shoulder functioning as an abutment for an end face of the sheath of the Bowden cable. Therefore, both the guiding means for the second traction wire and attachment means for attaching the outer sheath of the Bowden cable may be formed in a simple manner by providing a single hole having two different diameters to the body of the coupling device. Different methods may be used for fixing the sheath of the Bowden cable to the coupling device, e.g. a force fit, gluing, etc. In case that the second traction wire is permanently held under tension it may even by sufficient to simply introduce the sheath of the Bowden cable into the receiving portion of the hole where it is held by the force acting on the Bowden cable.

Preferably, the traction wire arrangement also comprises attachment means for fixedly attaching the end of the first traction wire to the coupling device. The attachment means may comprise an attachment hole formed in the body of the coupling device, the attachment hole having a diameter equal to or slightly larger than that of the first traction wire, and a nipple formed at the end of the first traction wire and having a diameter which is larger than that of the attachment hole. In this arrangement, the nipple prevents the first traction wire from coming off the coupling device when a tensile force is transmitted. This structure has the advantage of being very simple and at the same time providing a reliable attachment of the first traction wire to the coupling device.

Preferably, the attachment hole further comprises a widened portion for receiving the nipple of the first traction wire. Moreover, a connection to an outer surface of the body of the coupling device is preferably formed over the entire length of the attachment hole, the connection allowing for the insertion of the first traction wire therethrough into the attachment hole. In a similar way, a connection may also be provided which allows for the insertion of the nipple connected to the end of the second traction wire. By this means, it is possible to attach the first traction wire to the coupling device after the nipple has been mounted on the end of the first traction wire. Further, removal of the first traction wire from the coupling device is facilitated, e.g. for the purpose of maintenance or repair.

According to the present invention, a support assembly for a seat comprises a support member adapted to be incorporated into a seat frame, wherein the support assembly is adjustable by simultaneously acting on a first side of the support member and on a second side of the support member. The support assembly includes the traction wire arrangement as explained above, the first traction wire extending from the coupling device towards the first side of the support member and the second traction wire extending from the coupling device towards the second side of the support member. The first traction wire and the second traction wire are slidably held with respect to the support member. For this purpose, the support member preferably comprises holding means for slidably holding the first traction wire and the second traction wire with respect to the support member. The other end of the first traction wire is adapted to be connected to one side of the seat frame and the end of the second traction wire is adapted to be connected to the opposite side of the seat frame, the two sides of the seat frame being generally located in the vicinity of the first side and the second side of the support members, respectively.

In the support assembly as described above, a tensile force is simultaneously transmitted via the first traction wire and the second traction wire, which are slidably held by the holding means, to the support member. The length of the portions of the first traction wire and of the second traction wire extending from the support member and connecting to the seat frame is decreased in a symmetric fashion so that the support member is pulled towards the seat frame. Therefore, the degree of support provided by the support assembly can be adjusted in a desirable symmetric way.

Preferably, the other end of the traction wire and/or the end of the second traction wire has a shape to be hooked into the seat frame, e.g. by providing an end portion having the shape of a Z-nipple. In this way, mounting of the support assembly to the seat frame is facilitated. The holding means may be formed as two separate components to be connected to the support member at each side thereof, or may be formed as a single holding device extending on the support member along a transversal direction from the first side to the second side. The latter alternative may in particular be advantageous with respect to assembling the support assembly. Preferably, assembling is further facilitated by connecting the holding means to the support member by means of a clip mechanism, i.e. a clip portion provided on the holding means.

In addition, it is preferred that guiding means are provided for guiding the first traction wire and/or the second traction wire in the portion between the holding means and the attachment point to the seat frame. In this region, the traction wires are subjected to a high stress as the forces are transmitted to the support member essentially at the holding means. By providing the guiding means, which preferably have a convexly curved guiding surface along which the wire runs, the load can be distributed and sharp bendings of the traction wire are avoided.

Further, it is preferred that the coupling device of the traction cable arrangement is slidably connected to the support member so as to be movable along the transversal direction. According to a preferred embodiment, a single holding device is provided which provides both for the slidable connection of the coupling device and for the holding of the first traction wire and the second traction wire with respect to the support member. The single holding device is preferably formed as a plastic band extending across the support member. For providing the slidable connection of the coupling device, a slot may be formed in the plastic band for receiving a projection of the coupling device. The projection may have a widened portion having a width larger than that of the slot for holding the coupling device with respect to the plastic band. For facilitating the attachment of the coupling device to the plastic band, the slot may have a widened portion allowing for the widened portion of the projection to be inserted therethrough. Alternatively, guiding rails may be formed on the plastic band, the guiding rails extending along the transversal direction and being adapted to receive a corresponding lateral projection of the coupling device.

According to the present invention, the support member is preferably formed by a wire framework comprising two lateral side wires and transverse wires extending between the lateral side wires.

As can be seen from the above, the present invention allows for providing a symmetric support feeling by using only a single Bowden cable for adjusting the support assembly. By this means, the complexity of the assembly and the efforts in manufacturing are kept at a low level. Moreover, the traction wires can follow a smooth curve without any sharp bendings, thereby avoiding stresses and improving the durability.

In the following, preferred embodiments of the present invention will be explained in detail with reference to the accompanying drawings.

Figure 2:
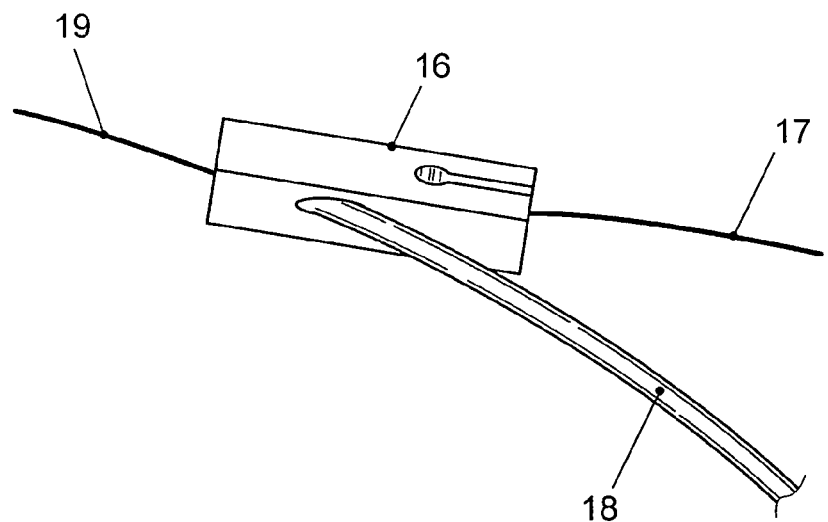
Figure 3A:
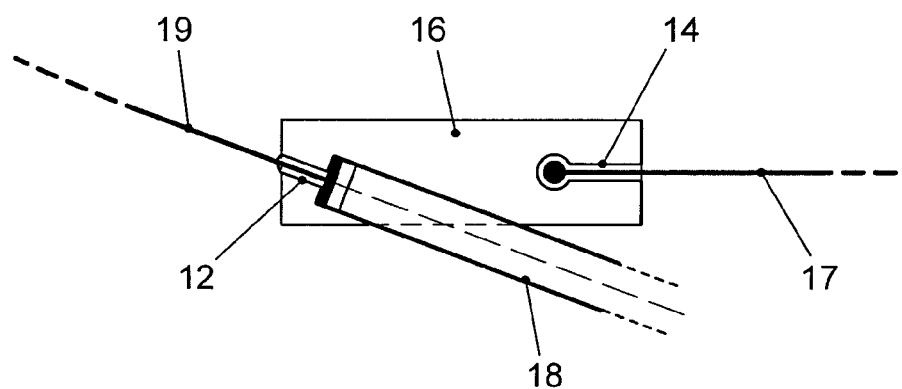
Figure 3B:
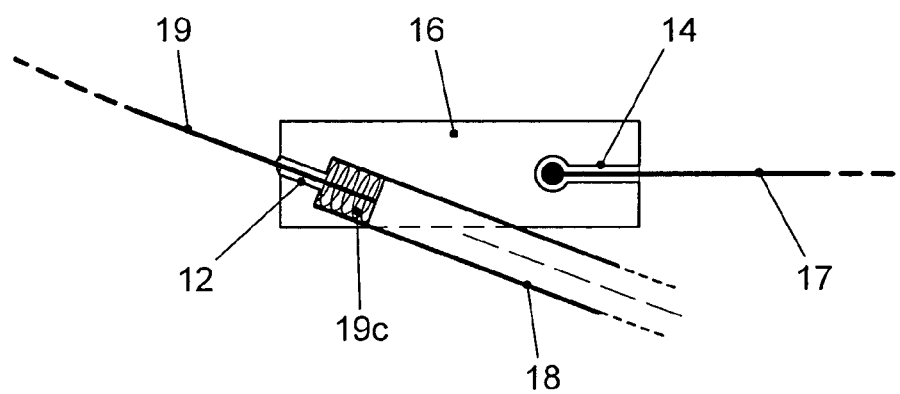
Figure 4:
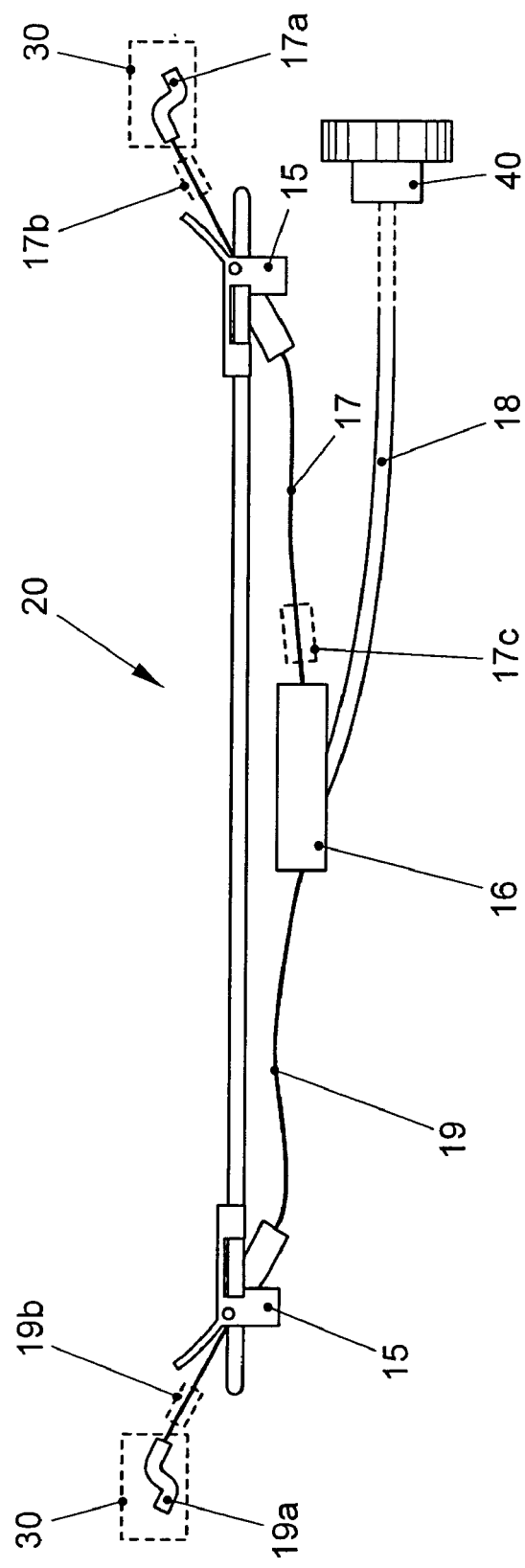
Figure 5:
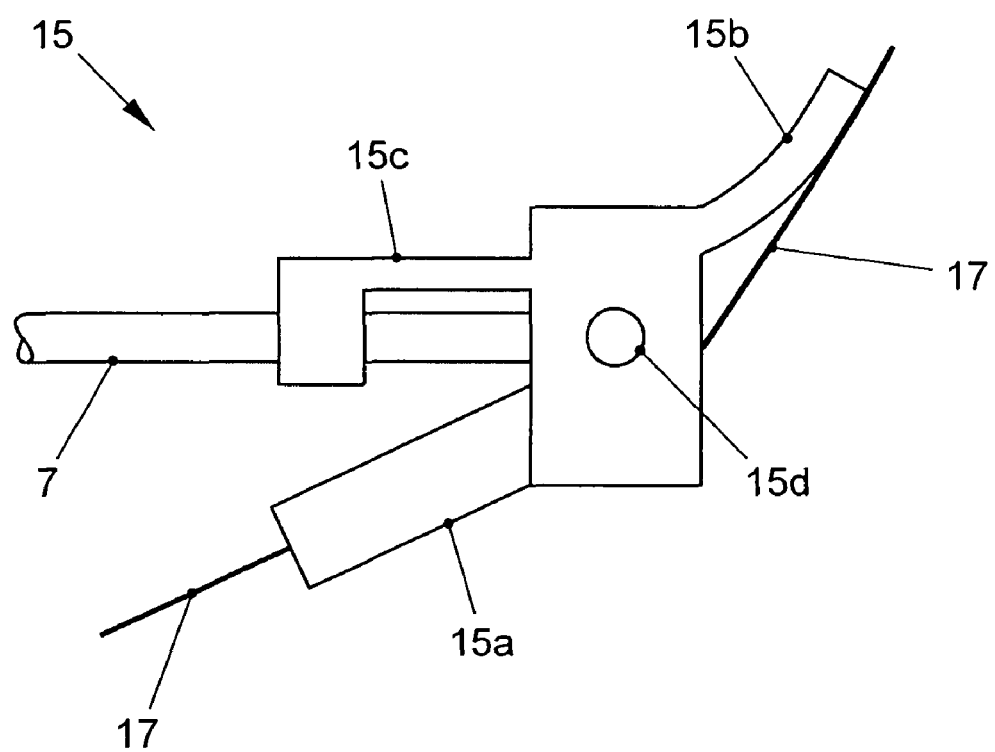
Figure 6A:
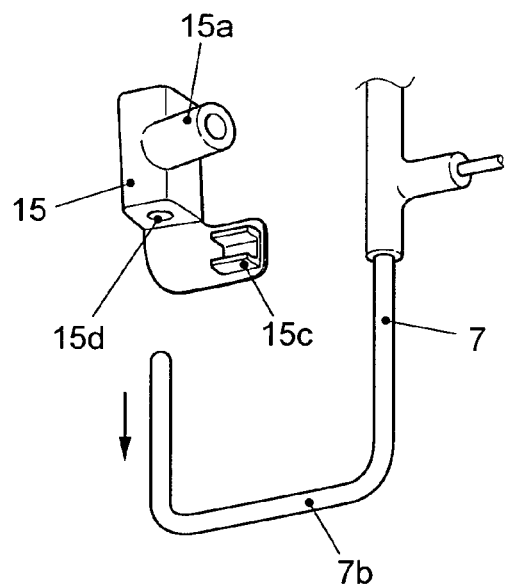
Figure 6B:
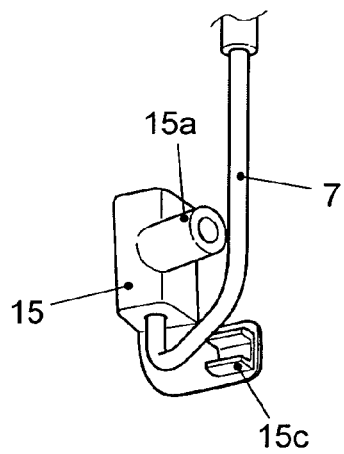
Figure 6C:
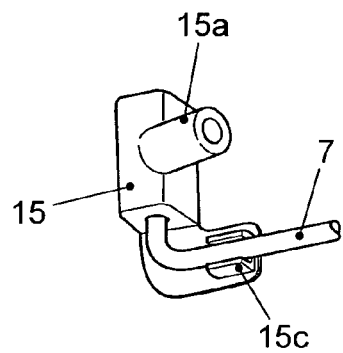
Figure 7:
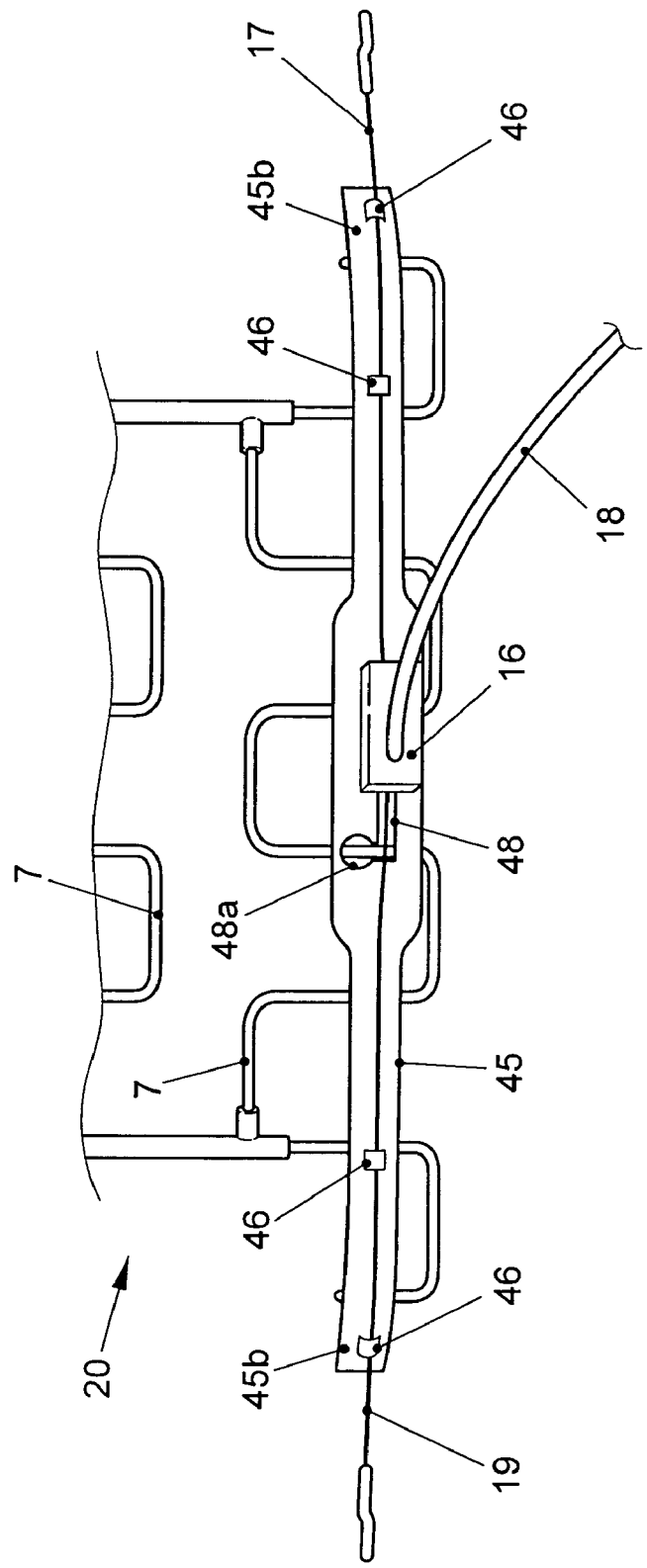
Figure 8:
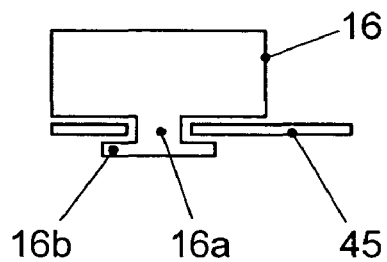
Figure 9:
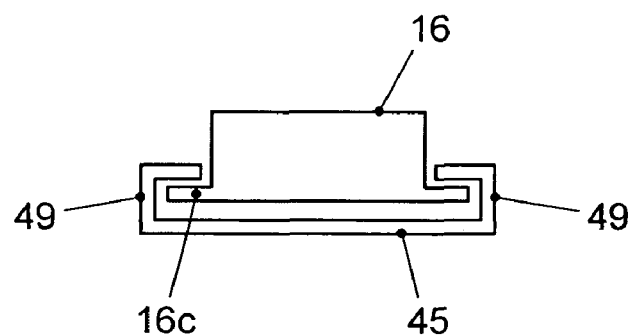
Figure 10:
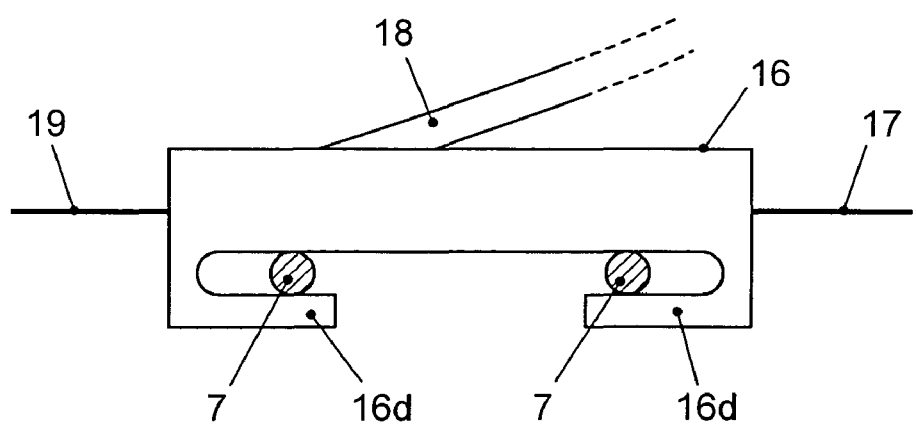

FIG. 1 shows a perspective view of a lumbar support assembly according to an embodiment of the present invention, FIG. 2 shows a perspective view illustrating a traction wire assembly according to an embodiment of the present invention, FIG. 3A shows a cross-sectional view of the traction wire arrangement of FIG. 2, FIG. 3B shows a cross-sectional view of a modification of the traction wire arrangement of FIG. 2, FIG. 4 is a side view illustrating the operation of the support assembly of FIG. 1, FIG. 5 is a schematic illustration of a plate clip acting as a holding means for slidably holding a traction wire with respect to a support member of the support assembly of FIGS. 1 and 3, FIG. 6 illustrates the process of mounting the plate clip on a wire framework of the support member, FIG. 7 illustrates an alternative embodiment of the support assembly having a plastic band acting as a holding means for slidably holding the traction wires of the support assembly with respect to the wire framework of the support member, FIG. 8 illustrates a slidable connection of a coupling device of the traction wire arrangement with respect to the holding means, FIG. 9 illustrates an alternative arrangement for slidably holding the coupling device on the holding means, and FIG. 10 illustrates an arrangement for slidably holding the coupling device on the wire framework of the support member.

In the following, the present invention will be explained with respect to an adjustable lumbar support assembly comprising a wire framework as a support member. The support assembly is configured to be incorporated into a backrest of a vehicle seat. However, the concepts explained hereinafter are also applicable to other types of support assemblies using different types of support members or providing the support in a different region.

FIG. 1 shows a perspective view of a lumbar support assembly. The lumbar support assembly comprises a support member 20 essentially formed of a wire framework having two lateral side wires 4 and a plurality of transverse wires 7, 7'. The transverse wires 7 extend between the lateral side wires 4, thereby forming a main portion of the support member 20. An additional transverse wire 7' is connected to the main portion using flexible connectors 8 having stripe-like portion extending along a longitudinal direction, i.e. in parallel to the lateral side wires 4. By means of the flexible connectors 8, the support member 20 is provided with a certain degree of flexibility so that the main portion can be moved with respect to the additional transverse wire 7'. The wire mat is formed of separate wires which are overmoulded with a plastic material. The lateral side wires 4 may actually consist of overmoulding material which joins the transverse wires 7 and has a substantially round cross-sectional shape.

The transverse wires 7, 7' generally extend between a first side and a second side of the support member 20 and are provided with undulations extending in a support plane of the support member 20. The undulations consist of an alternating series of longitudinal and transverse portions of the transverse wire 7, 7'. By means of the undulations, the transverse wires offer an increased support area for providing load bearing support for upholstery or cushioning of the seat. Further, the support member 20 becomes extendable under a load applied to the support assembly. The support member 20 as illustrated in FIG. 1 may also be referred to as a suspension pad or a platform element.

As can be further seen from FIG. 1, some of the transverse wires 7, 7' have end portions extending laterally beyond the lateral side wires 4, thereby forming free end portions 7a, 7b which are generally used for attaching the support assembly to a seat frame (not shown in FIG. 1). The free end portions 7a are formed in a hook-like shape so that they can be engaged with a corresponding eye or hole in the seat frame. For providing additional flexibility, it is also possible to connect the end portions 7a to the seat frame via tension springs interposed between the seat frame and the end portions 7a. The tension springs could also be integrally formed with the end portions 7a of the transverse wires 7, 7'.

The free end portions 7b of the lowermost transverse wire 7 are configured to provide an adjustable connection to the seat frame, allowing for an adjustment of the degree of support provided by the support assembly. The structure and operation of the adjusting mechanism will in the following be explained in more detail.

As illustrated in FIG. 1, the adjusting mechanism comprises a traction wire arrangement essentially consisting of a Bowden cable 18, a first traction wire 17, a second traction wire 19, and a coupling device 16 for coupling the Bowden cable 18 and the traction wires 17, 19. The traction wires 17, 19 extend from the coupling device 16 generally along the transverse direction and are slidably held on the support member 20 by plate clips 15 connected to the end portions 7b of the lowermost transverse wire. In particular, the first traction wire 17 extends from the coupling device 16 to the first side of the support member 20 where it is slidably guided through the plate clip 15 and then terminates in a an end portion 17a which has the shape of a Z-nipple. By means of the Z-nipple, the end portion of the first traction wire 17 can be easily hooked into a corresponding receiving structure on the seat frame, e.g. an eye or a hole. In a similar manner, the second traction wire 19 extends from the coupling device 16 towards the second side of the support member 20 where it is slidably guided through the plate clip 15, and terminates in an end portion 19a having the shape of a Z-nipple for attaching the end portion 19a of the second traction wire to the seat frame. Accordingly, the support member is configured to be attached to opposite sides of the seat frame via the traction wires 17, 19. By simultaneously shortening portions of the traction wires 17, 19 extending from the support member 20, the support member can therefore be pulled towards the seat frame, thereby increasing the degree of lumbar support. Similar as with the end portions 7a, the end portions 17a, 19a of the traction wires 17, 19 can be provided with an indirect connection to the seat frame via tension springs so as to increase the flexibility of the support assembly. Further, it is to be understood that the adjustable connection to the seat frame could also be provided at a different position, e.g. in the middle region of the support member 20.

In the following, the simultaneous shortening of the traction wires 17, 19 will be explained in more detail. FIG. 2 shows a perspective view of the traction wire arrangement comprising the Bowden cable 18, the first traction wire 17, the second traction wire 19, and the coupling device 16. FIG. 3A shows a sectional view of the traction wire arrangement.

As illustrated, the coupling device 16 is essentially formed as a solid body in which holes are formed for attaching of guiding the first traction wire 17 and the second traction wire 19. The coupling device may be formed of a plastic material or of a metal. An attachment hole 14 for attaching the first traction wire 17 terminates at one end face of the coupling device 16. A guiding hole 12 for slidably guiding the second traction wire 19 terminates at an opposite end face of the coupling device 16. The attachment hole 14 and the guiding hole 12 have a diameter equal to or slightly larger than the first traction wire 17 and the second traction wire 19, respectively. The attachment hole 14 has an end portion inside the coupling device which is widened so as to receive a nipple mounted on the end of the first traction wire 17. A slot-shaped connection to a side face of the coupling device 16 is formed along the entire length of the attachment hole 14, including the widened portion, thereby allowing for the insertion of the end of the first traction wire including the nipple into the attachment hole 14. In this arrangement, the first traction wire 17 can be assembled with the nipple and then easily be attached to the coupling device.

The guiding hole 12 for the second traction wire 19 extends from the end face of the coupling device 16 in an oblique direction through the body of the coupling device 16. An entry to the guiding hole 12 is formed in a side face of the coupling device 16. Starting from the side face, the guiding hole 12 comprises a widened portion having a diameter substantially equal to the outer diameter of the Bowden cable 18. At the end of the widened portion, an annular shoulder is formed inside the guiding hole which serves as an abutment for an end face of the sheath of the Bowden cable 18. The Bowden cable 18 is inserted into the widened portion of the guiding hole 12 in such a manner that the end face of the sheath abuts on the shoulder of the guiding hole 12. The wire of the Bowden cable 18 further extends through the guiding hole 12 and forms the second traction wire 19. The sheath of the Bowden cable 18 is held inside the widened portion of the guiding hole 12 by the tension applied to the second traction wire 19. In addition, the sheath of the Bowden cable 18 may be fixed inside the widened portion by means of a force fit or gluing.

As can be seen, in the traction wire arrangement as described above, the first traction wire 17 is fixedly attached to the coupling device 16 and the second traction wire 19 is slidably guided through the coupling device 16 and may be extended or retracted by means of an actuating mechanism connected to the other end of the Bowden cable 18. The first traction wire 17 and the second traction wire 19 extend from the coupling device 16 in substantially opposite directions, thereby allowing for oppositely directed tensile forces to be transmitted via the traction cable 17, 19. As the guiding hole 12 extends through the body of the coupling device 16 in an oblique direction, the second traction wire 19 can follow a smooth curve and sharp bendings of the second traction wire are avoided. This may be further enhanced by providing the guiding hole 12 with a suitable curvature. Alternatively, the Bowden cable 18 could be inserted into the coupling device from the end face on which the first traction wire 17 is attached, thereby allowing for the second traction wire 19 to extend through the body of the coupling device 16 along a straight line. Furthermore, a connection to an outer surface of the coupling device 16 could be provided also in case of the guiding hole 12 so as to allow for the insertion of the second traction wire 19 therethrough.

FIG. 3B illustrates a modification of the traction wire arrangement as shown in FIGS. 2 and 3A. The modified arrangement includes an additional compression spring 19c which is inserted in the guiding hole 12, between the sheath of the Bowden cable 18 and the shoulder of the guiding hole 12. The compression spring 19c provides for an increased flexibility of the traction wire arrangement.

FIG. 4 shows a side view of the support assembly along the transverse direction. As illustrated, the support member 20 is connected to opposite sides of the seat frame 30 by means of the first traction wire 17 and the second traction wire 19. For this purpose, the Z-nipples of the traction wires are hooked into a corresponding receiving structure on the seat frame. In addition, tension springs 17b, 19b may be provided, as explained above. The tension springs 17b, 19b could also be integrally formed with the Z-nipples. In addition, a tension spring could be formed in the first traction wire 17 near the coupling device, as illustrated at 17c. The traction wires 17, 19 are slidably held on the support member 20 by means of the plate clips 15. The wire of the Bowden cable 18 which forms the second traction wire 19 extending from the coupling device 16 can be retraced or extended using an actuating mechanism 40. The actuating mechanism 40 is illustrated as a hand wheel. It is to be understood that also other types of actuating mechanism may be used, e.g. an electrically driven actuating mechanism.

The operation of the adjustable lumbar support assembly is as follows: By means of the actuating mechanism 40 the wire of the Bowden cable 18 is retracted inside the sheath of the Bowden cable. This causes the second traction wire 19 to be shortened. As a result, the second traction wire 19 is pulled-in through the plate clip 15 holding the second traction wire 19, thereby reducing the length of the portion of the second traction wire 19 extending between the plate clip 15 and the seat frame 30. In addition, the coupling device 16 is pulled by the second traction wire 19 or pushed by the sheath of the Bowden cable 18 towards the plate clip 15 holding the second traction wire 19, i.e. to the left side in the illustration of FIG. 4. This in turn causes the first traction wire 17, which is fixedly connected to the coupling device 16, to be pulled-in through the plate clip 15 holding the first traction wire 17, thereby reducing the length of the portion of the first traction wire extending between the plate clip 15 and the seat frame 30. As the first traction wire 17 and the second traction wire 19 extend from the coupling device 16 into opposite directions, tensile forces are transmitted via the traction wires 17, 19 which have equal magnitudes, but opposite directions. This causes the length of the portions of the traction wires 17, 19 extending between the plate clips 15 and the seat frame 30 to be reduced by the same amount, resulting in a symmetric displacement of the support member 20 towards the seat frame 30. Actuating the Bowden cable in the opposite direction, i.e. extending the second traction wire 19 from the coupling device 16, causes an opposite movement of the support member.

FIG. 5 shows a more detailed illustration of the plate clip 15 holding the first traction wire 17 on the support member 20. The plate clip 15 for holding the second traction wire 19 on the support member 20 is configured in a similar way. As can be seen from FIG. 5, the plate clip 15 comprises a guiding portion 15a through which the traction wire 17 is guided. The guiding portion 15a is formed as a tubular portion through which a guiding hole is formed. In addition, a guiding member 15b is provided which extends from the plate clip 15 towards the seat frame and has a convexly curved guiding surface along which the traction wire 17 is guided. The guiding portion 15a and the guiding member 15b are arranged in such a manner that the traction wire 17, which arrives at the plate clip 15 in an essentially transverse direction, is smoothly redirected towards the seat frame. By this means, the load transmitted from the traction wire 17 to the support member via the plate clip 15 is distributed and sharp bendings of the traction wire 17 are avoided, thereby increasing the durability of the support assembly.

The plate clip 15 further comprises a clip portion 15c and a receiving hole 15d which serve for the connection of the plate clip 15 to the wire 7 of the support member. The plate clip 15 is preferably formed of a plastic material.

FIG. 6 illustrates the process of attaching the plate clip 15 to the end portion 7b of the transverse wire 7. In a first step, which is illustrated in FIG. 6a), the plate clip 15 is slipped on the longitudinal end portion of the wire 7 in such a manner that the wire is received inside the receiving hole 15d of the plate clip 15. When the clip portion 15c of the plate clip 15 comes into alignment with a transverse portion extending from the longitudinal end portion of the wire 7, the plate clip 15 is rotated about the pivot axis formed by the longitudinal end portion of the wire 7 so that the transverse portion of the wire 7 is received inside the clip portion 15c of the plate clip 15, as illustrated in FIG. 6b). The final state of the plate clip 15 mounted on the transverse wire 7 is shown in FIG. 6c).

FIG. 7 shows an alternative arrangement for slidably holding the traction wires 17, 19 on the support member 20. The support member 20 generally has the same structure as explained above with respect to FIG. 1. However, instead of the plate clips 15, a plastic-band holding device 45 is used as a holding means for slidably holding the traction wires 17, 19 on the support member 20. The plastic-band holding device 45 constitutes a single holding device extending from one side of the support member 20 to the opposite side thereof.

The holding device has guiding portions 46 formed thereon. The traction wires 17, 19 pass through the guiding portions 46 and are thereby slidably held with respect to the support member 20. The plastic-band holding device 45 is preferably secured to the support member 20 by means of clip portions similar to that formed on the plate clips 15.

In a central portion of the plastic-band holding device 45, connecting means are provided for slidably holding the coupling device 16 on the plastic-band holding device 45. The connecting means comprise a slot provided in the plastic-band holding device 45. The slot 48 extends in the transverse direction and is configured to receive therein a projection extending from the coupling device 16. The slot 48 comprises a widened portion 48a which allows for the insertion of the projection of the coupling device 16 when assembling the support member 20 with the traction wire arrangement. In the structure according to FIG. 7, undesired movements of the coupling device 16 in the longitudinal direction or away from the support member 20 are prevented, thereby resulting in a more effective conversion of the force applied to the Bowden cable to the tensile forces transmitted via the traction wires 17, 19. Further, the load which is applied to the support member 20 when shortening the traction wires 17, 19 is distributed over a large area, thereby improving the durability of the support assembly. In this respect, is should be noted that the plastic-band holding device 45 comprises curved end portions 45b which function as guiding members for the traction wires 17, 19, similar to the guiding members 15b of the plate clips. By this means, sharp bendings of the traction wires 17, 19 are avoided and the durability is further improved.

FIG. 8 is a sectional view further illustrating the slidable connection of the coupling device 16 to the plastic-band holding device 45. As illustrated, the coupling device 16 comprises a projection 16a configured to be slidably received in the slot 48 of the plastic-band holding device 45. The projection 16a has a width which is equal to or slightly smaller than the width of the slot 48. A widened portion 16b is formed at the end of the projection 16a and engages the plastic-band holding device 45 on a side facing away from the coupling device 16. By this means, the coupling device 16 is securely held on the plastic-band holding device 45. The widened portion 48a of the slot 48 is configured with a size and shape which is suitable for allowing the widened portion 16b of the projection 16a to be inserted therethrough.

FIG. 9 shows an alternative arrangement for slidably holding the coupling device 16 on the plastic-band holding device 45. In this case, guide rails 49 are formed along the transversal direction. The coupling device 16 comprises lateral projections 16c which are configured to be received within an interior portion of the guide rails 49. Also in this arrangement, undesired movements of the coupling device 16 in the longitudinal direction or in a direction away from the support member 20 are prevented.

FIG. 10 shows an arrangement for slidably holding the coupling device 16 directly on the wire framework of the support member 20. For this purpose, the coupling device 16 comprises receiving portions 16d. The receiving portions 16d are configured to receive therein a longitudinal portion of one of the transverse wires 7. As illustrated, the receiving portions 16d each enclose the portion of the transverse wire 7 from three sides and have an elongated shape which allows for displacing the transverse wire 7 inside the receiving portion 16d. In FIG. 10, the receiving portions 16d are configured as U-shaped grooves with their respective open sides facing towards each other. Alternatively, the open sides of the U-shaped grooves could be facing away from each other. The closed sides of the grooves serve as an abutment for the transverse wire 7 when the coupling device is displaced in the transversal direction and thereby limit the total range of movement. Displacement of the coupling device 16 away from the support member is avoided.

In the foregoing, the lumbar support assembly has been described as comprising a support member 20 which is formed of a wire framework. Alternatively, a different type of support member may be used, e.g. a plate member. Depending on the configuration of the support member, it may be advantageous to form means for holding and guiding the traction wires 17, 19 with respect to the support member directly on the support member, i.e. integrally therewith. In this case, the functions of the plate clips or of the plastic-band holding device could be integrated into the support member.

The invention claimed is:

1. A support assembly for a seat, comprising:
   a support member adapted to be incorporated into a seat frame, and
   a traction wire arrangement for adjusting the support member by simultaneously acting on a first side and on a second side of the support member,
   wherein the traction wire arrangement comprises:
   a Bowden cable having a wire and a sheath,
   a first traction wire, and
   a coupling device for coupling the first traction wire and the Bowden cable,
   wherein the sheath of the Bowden cable is at one end attached to the coupling device,
   wherein the first traction wire is at one end attached to the coupling device and extends from the coupling device in a first direction, and
   wherein the wire of the Bowden cable extends from the coupling device in a second direction,
   which is substantially opposite to the first direction, to form a second traction wire,
   wherein the first traction wire extends from the coupling device towards the first side of the support member, and
   wherein the second traction wire extends from the coupling device towards the second side of the support member,
   wherein the first traction wire and the second traction wire is slidably held with respect to the support member, and
   wherein the other end of the first traction wire is adapted to be connected to one side of the seat frame and the end of the second traction wire is adapted to be connected to the opposite side of the seat frame.

2. The support assembly according to claim 1,
   wherein the coupling device comprises a guiding device for guiding the second traction wire into the second direction.

3. The support assembly according to claim 2,
   wherein the guiding device for guiding the second traction wire comprise a guiding hole extending through a body of the coupling device.

4. The support assembly according to claim 3,
   wherein the diameter of the guiding hole is equal to or slightly larger than that of the second traction wire.

5. The support assembly according to claim 4,
   wherein the guiding hole comprises at one end thereof a widened portion having a diameter substantially corresponding to the outer diameter of the sheath of the Bowden cable, whereby inside the guiding hole a receiving portion for the sheath of the Bowden cable and a shoulder are formed, the shoulder functioning as an abutment for an end face of the sheath of the Bowden cable.

6. The support assembly according to claim 1, comprising an attachment device for fixedly attaching the end of the first traction wire to the coupling device.

7. The support assembly according to claim 6, wherein the attachment device comprises an attachment hole formed in a body of the coupling device, wherein the attachment hole has a diameter equal to or slightly larger than the diameter of the first traction wire, and a nipple formed at the end of the first traction wire, wherein the nipple has an outer dimension which is larger than the diameter of the attachment hole.

8. The support assembly according to claim 7, wherein the attachment hole comprises a widened portion for receiving the nipple of the first traction wire.

9. The support assembly according to claim 8, wherein a connection is provided between the attachment hole and an outer surface of the coupling device, the connection allowing for the insertion of the first traction wire into the attachment hole.

10. The support assembly according to claim 1, wherein the other end of the first traction wire and/or the end of the second traction wire is configured with a shape to be hooked into the seat frame.

11. The support assembly according to claim 1, wherein the other end of the first traction wire and/or the end of the second traction wire forms an end portion having the shape of a Z-nipple.

12. The support assembly according to claim 1, wherein the support member comprises a holding device for slidably holding the first traction wire and the second traction wire with respect to the support member.

13. The support assembly according to claim 12, wherein the holding device has a clip portion for attaching the holding device to the support member.

14. The support assembly according to claim 13, wherein the holding device extends from the first side of the support member to the second side of the support member.

15. The support assembly according to claim 14, further comprising
a connecting device for slidably connecting the coupling device to the holding device.

16. The support assembly according to claim 15, wherein the holding device has a band shape and comprises a slot extending in a transversal direction, wherein a projection adapted to be slidably received in the slot is provided on the coupling device.

17. The support assembly according to claim 16, wherein the projection is provided with a widened portion having a width larger than the width of the slot, wherein the slot comprises a widened portion allowing for the widened portion of the projection to be inserted therethrough.

18. The support assembly according to claim 15, wherein the holding device comprises at least one guiding rail extending along the transversal direction, wherein the coupling device comprises at least one lateral projection adapted to be slidably received in an interior portion of the at least one guiding rail.

19. The support assembly according to claim 12, wherein the holding device has a guiding device for guiding the first traction wire or the second traction wire.

20. The support assembly according to claim 19, wherein the guiding device has a convexly curved guiding surface along which the first traction wire or the second traction wire is guided.

21. The support assembly according to claim 1, wherein the coupling device is slidably connected to the support member.

22. The support assembly according to claim 1, wherein the support member comprises a wire framework.

23. The support assembly according to claim 1, wherein an actuating mechanism connected to the other end of the Bowden cable and configured to selectively extend or retract the wire of the Bowden cable with respect to the sheath of the Bowden cable.

24. A seat structure comprising:
a seat frame, and
a support assembly according to claim 1.

* * * * *